Aug. 27, 1957  I. S. DE WOSKIN ET AL  2,804,419
HEAT-SEALING CLOTH AND PLASTIC
Filed July 14, 1955

Irvin S. De Woskin,
Murgatroyd H. Jenkins,
Inventors.
Koenig and Pope,
Attorneys.

United States Patent Office 2,804,419
Patented Aug. 27, 1957

2,804,419

HEAT-SEALING CLOTH AND PLASTIC

Irvin S. De Woskin, University City, and Murgatroyd H. Jenkins, Overland, Mo., assignors to Beltx Corporation, St. Louis, Mo., a corporation of Missouri Application July 14, 1955, Serial No. 522,058

8 Claims. (Cl. 154—116)

This invention relates to methods of securing together cloth and heat-sealable sheet plastic material, and more particularly to methods of electronically heat-sealing such materials.

Among the several objects of the invention may be noted the provision of a method of securing together heat-sealable sheet plastic material, such as a vinyl resin, and cloth, such as nylon tricot, by heat sealing, and adapted for the utilization of conventional electronic heat sealing apparatus; the provision of a method of this class which makes it possible readily to form a narrow seam between the sheet plastic and the cloth without unduly weakening the plastic or the cloth along the seam; and the provision of a method of this class which does not require any particularly accurate positioning of the materials in respect to the heat sealing instrumentalities, and which is therefore easy and economical to carry out. Essentially the method of this invention involves assembling the sheet plastic and the cloth with an auxiliary piece of heat-sealable plastic on the other side of the cloth from the sheet plastic, effecting heating and compression of the assembly within a zone of smaller area than the auxiliary piece of plastic to effect a fusion of the sheet plastic and the auxiliary piece of plastic through the cloth within said zone, and peeling away the excess unfused portion of said auxiliary piece of plastic from around said zone. Other objects and features will be in part pointed out hereinafter.

The invention accordingly comprises the methods hereinafter described, the scope of the invention being indicated in the following claims.

In the accompanying drawings, in which several of various possible embodiments of the invention are illustrated, Fig. 1 is a perspective view with parts shown in section illustrating an initial phase of the method of this invention, thicknesses being exaggerated;

Corresponding reference characters indicate corresponding parts throughout the several views of the drawings.

Figure 1:
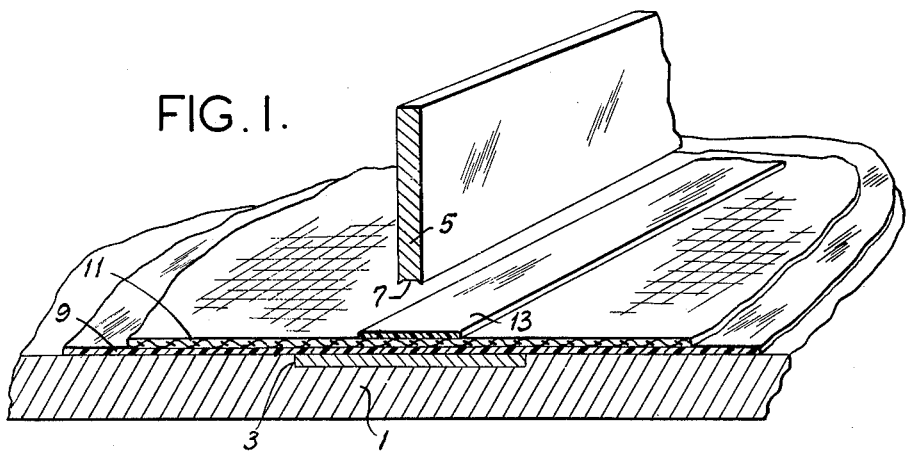

Referring to the drawings, there is indicated at 1 the bed of an electronic heat sealing press of a well-known commercially available type adapted to effect heating of heat-sealable sheet plastic by dielectric hysteresis and to apply pressure to the pieces to be heat-sealed. On the bed is a pressure plate 3 of nonconductive material. At 5 is indicated the die of the press. In the instant case, this consists of a relatively thin bar (one-sixteenth inch thick, for example), shown as having a concave lower edge 7, though this edge could be flat. The drawings illustrate the seaming together of a piece of heat-sealable sheet plastic material 9, such as a vinyl resin plastic, and a piece of cloth 11, such as nylon tricot.

In accordance with this invention, pieces 9 and 11 are assembled with an auxiliary piece 13 of heat-sealable plastic, such as vinyl resin, on the other side of the cloth from the piece 9. As shown, the auxiliary piece 13 consists of a strip of plastic wider than the die or bar 5 applied to extend along the region where the seam is to be formed. The heat sealing die or bar 5 being raised (Fig. 1), the assembly is placed on the bed of the press with the strip 13 extending under the die or bar 5. The strip 13 being wider than the die or bar, considerable latitude is thereby permitted in the placement of the assembly on the press bed.

Figure 2:
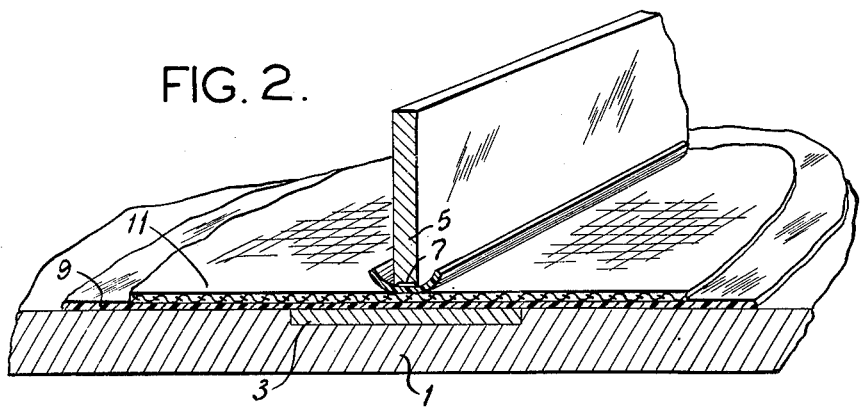
Fig. 2 is a view similar to Fig. 1 illustrating a later phase.

As shown in Fig. 1, the strip 13 is on top, and as shown in Fig. 2 the bar 5 is lowered to bring its lower edge 7 into contact with the strip and to effect heating (by dielectric hysteresis) and compression of the assembly along the narrow zone of contact of the bar and the strip. The heating is such as to effect a fusion of the piece 9 and the strip 13 through the cloth 11 along the stated zone, this zone extending lengthwise of the strip.

Figure 3:
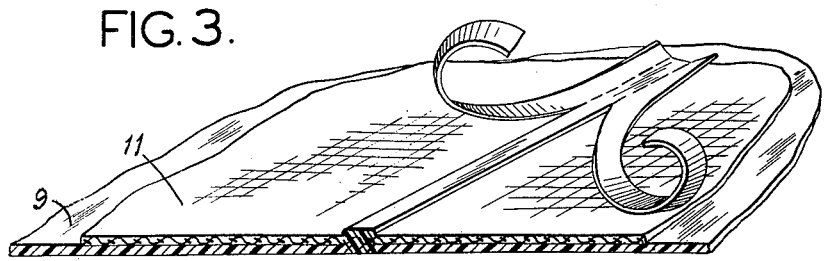
Fig. 3 is a view similar to Fig. 2 and illustrating a peeling step of the method; and, Fig. 4 is a view similar to Fig. 1 illustrating a modification.

After fusion has occurred, the bar 5 is raised and then the excess and unfused portion of the strip surrounding the zone where fusion has occurred is peeled away as illustrated in Fig. 3. This unfused portion of the strip separates readily from the fused portion. The peeling away of the unfused portion of the strip does not weaken the seam formed between the pieces 9 and 11 by the fusion of piece 9 through the cloth 11 with plastic from the strip 13.

Figure 4:
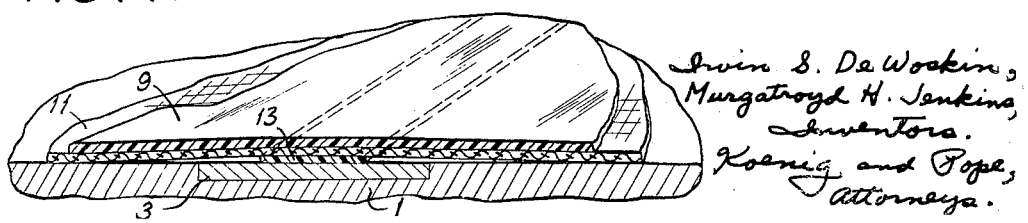

Instead of having the strip 13 on top for the heat sealing operation, the strip may be on the bottom, as shown in Fig. 4.

The method of this invention is applicable for securing together pieces of heat-sealable sheet plastic and cloth in face-to-face relation, or for forming edge seams between such pieces. For example, it may be applied to the securing together of the sheet vinyl resin and nylon tricot layers of the crotch section of a sanitary panty, or to the edge seaming of a piece of sheet vinyl resin to nylon tricot to form a pocket.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

We claim:

1. The method of securing together heat-sealable sheet plastic and cloth comprising assembling the sheet plastic and the cloth with an auxiliary piece of heat-sealable plastic on the other side of the cloth from the sheet plastic, effecting heating and compression of the assembly within a zone of smaller area than said auxiliary piece of plastic to effect a fusion of the sheet plastic and the auxiliary piece of plastic through the cloth within said zone, and peeling away the excess unfused portion of said auxiliary piece of plastic from around said zone.

2. The method of seaming heat-sealable sheet plastic and cloth comprising assembling the sheet plastic and the cloth with a strip of heat-sealable plastic on the other side of the cloth from the sheet plastic and extending along the region where the seam is to be formed, effecting heating and compression of the assembly along a zone narrower than the strip and extending lengthwise of the strip to effect a fusion of the sheet plastic and the strip through the cloth along said zone, and peeling away the excess unfused portion of said strip from around said zone.

3. The method of seaming heat-sealable sheet plastic and cloth comprising assembling the sheet plastic and the cloth with a strip of heat-sealable plastic on the other side of the cloth from the sheet plastic and extending along the region where the seam is to be formed, applying to the assembly an electronic heat sealing bar narrower than the strip with the bar extending along the length of the strip, said bar acting to effect heating and compression of the assembly to effect a fusion of the sheet plastic and the strip through the cloth along a narrow zone which extends lengthwise of the strip, and peeling away the excess of said strip from around said zone of fusion.

4. The method of claim 3 wherein the bar is applied to the sheet plastic.

5. The method of claim 3 wherein the bar is applied to the strip.

6. The method of seaming heat-sealable sheet vinyl resin plastic and nylon tricot comprising assembling the sheet plastic and the tricot with a strip of heat-sealable vinyl resin plastic on the other side of the tricot from the sheet plastic and along the region where the seam is to be formed, applying to the assembly an electronic heat sealing bar narrower than the strip with the bar extending along the length of the strip, said bar acting to effect heating and compression of the assembly to effect a fusion of the sheet plastic and the strip through the tricot along a narrow zone which extends lengthwise of the strip, and peeling away the excess of said strip from around said zone of fusion.

7. The method of claim 6 wherein the bar is applied to the sheet vinyl resin plastic.

8. The method of claim 6 wherein the bar is applied to the strip of vinyl resin plastic.

References Cited in the file of this patent

UNITED STATES PATENTS

| | | |
|---|---|---|
| 1,073,858 | Kaufman | Sept. 23, 1913 |
| 2,048,895 | Rosen | July 28, 1936 |
| 2,372,737 | Phillips | Apr. 3, 1945 |
| 2,388,266 | Junkin | Nov. 6, 1945 |
| 2,430,459 | Farrell et al. | Nov. 11, 1947 |
| 2,609,317 | Vogt | Sept. 2, 1952 |
| 2,640,796 | Langer | June 2, 1953 |
| 2,686,556 | Gerber et al. | Aug. 17, 1954 |